United States Patent
Parker et al.

(10) Patent No.: US 11,277,333 B2
(45) Date of Patent: Mar. 15, 2022

(54) SYSTEMS FOR ROUTE FINDING IN NETWORKS AND A NETWORK OF NETWORKS

(71) Applicant: Inflect, Inc., Seal Beach, CA (US)

(72) Inventors: Cécile Parker, San Francisco, CA (US); Eric Silverman, San Francisco, CA (US); William Lindeman, San Francisco, CA (US); Matthew Natali, San Francisco, CA (US); Josh Neuroth, Oakland, CA (US)

(73) Assignee: Inflect, Inc., Seal Beach, CA (US)

( * ) Notice: Subject to any disclaimer, the term of this patent is extended or adjusted under 35 U.S.C. 154(b) by 0 days.

(21) Appl. No.: 16/587,266

(22) Filed: Sep. 30, 2019

(65) Prior Publication Data
US 2020/0106697 A1 Apr. 2, 2020

Related U.S. Application Data

(60) Provisional application No. 62/739,450, filed on Oct. 1, 2018.

(51) Int. Cl.
*H04L 12/707* (2013.01)
*H04L 12/721* (2013.01)
(Continued)

(52) U.S. Cl.
CPC .............. *H04L 45/22* (2013.01); *H04L 45/02* (2013.01); *H04L 45/121* (2013.01); *H04L 45/122* (2013.01); *H04L 45/127* (2013.01)

(58) Field of Classification Search
CPC ....... H04L 45/22; H04L 45/127; H04L 45/02; H04L 45/121; H04L 45/122
See application file for complete search history.

(56) References Cited

U.S. PATENT DOCUMENTS

| | | | |
|---|---|---|---|
| 2010/0142445 A1* | 6/2010 | Schlicht | H04W 4/23 370/328 |
| 2016/0188767 A1* | 6/2016 | Razin | G06F 30/18 703/13 |

(Continued)

OTHER PUBLICATIONS

International Search Report and Written Opinion dated Dec. 31, 2019, from the ISA/US, for International Application No. PCT/US19/53738 (filed Sep. 30, 2019), 24 pages.

(Continued)

*Primary Examiner* — Kevin C. Harper
*Assistant Examiner* — Henry Baron
(74) *Attorney, Agent, or Firm* — Ascenda Law Group, PC (57) ABSTRACT

Systems and methods for route finding in networks and/or in a network of networks. A server is communicatively coupled to a datastore, which hosts a model of an industry of Internet infrastructure as a graph. Nodes of the graph represent physical components that make up various networks that, collectively, interconnect with one another, infrastructure components that house the physical components, and entities owning and/or operating any of these equipment and facilities. Edges of the graph, which are preferably directed in nature as defined by labels, represent the relationships between the physical components. The server hosts and employs a route-finding application that utilizes the graph to search for an optimal path between nodes of the graph responsive and according to user-specified criteria.

17 Claims, 13 Drawing Sheets

(51) Int. Cl.
*H04L 12/733* (2013.01)
*H04L 12/727* (2013.01)
*H04L 12/751* (2013.01)
*H04L 45/00* (2022.01)
*H04L 45/12* (2022.01)
*H04L 45/02* (2022.01)
*H04L 45/121* (2022.01)
*H04L 45/122* (2022.01)

(56) References Cited

U.S. PATENT DOCUMENTS

2017/0201585 A1* 7/2017 Doraiswamy ....... H04L 67/2804
2018/0060106 A1* 3/2018 Madtha ................... H04L 41/12
2018/0314957 A1* 11/2018 Kang .................. G06F 16/2379

OTHER PUBLICATIONS

International Preliminary Report on Patentability dated Apr. 15, 2021, from The International Bureau of WIPO, for International Patent Application No. PCT/US2019/053738 (filed Sep. 30, 2019), 15 pgs.

* cited by examiner

SYSTEMS FOR ROUTE FINDING IN NETWORKS AND A NETWORK OF NETWORKS

RELATED APPLICATIONS

This is a NONPROVISIONAL of, claims priority to, and incorporates by reference U.S. Provisional Application No. 62/739,450, filed Oct. 1, 2018.

FIELD OF THE INVENTION

The present invention relates to methods and systems for route finding in networks and/or in a network of networks, for example, the Internet.

BACKGROUND

The buying and selling of Internet infrastructure is a complex process. While some businesses are able to take advantage of public cloud facilities offered by various vendors, many find such offerings insufficient to meet their needs. For those organizations, the need to select from among thousands of datacenters and network and exchange providers worldwide to establish private clouds and other installations presents a daunting prospect. More than just cost, considerations such as available connection points, connection latencies, and other factors must be taken into account. Complicating this process is the fact that the underlying information needed to make these purchase decisions is often difficult to find and even more difficult to compare.

SUMMARY OF THE INVENTION

One embodiment of the invention provides a system for route finding in networks and/or in a network of networks. The system includes a server communicatively coupled to a datastore, with the datastore hosting a model of an industry of Internet infrastructure as a graph. In this model, nodes of the graph represent physical components that make up various networks that, collectively, interconnect with one another, infrastructure components that house the physical components and equipment that connects the physical components. Edges of the graph, which are preferably directed in nature as defined by labels, represent the relationships between the physical components. The physical components and equipment that connects the physical components can include datacenters, which are operated spaces within buildings, and the infrastructure components can include buildings housing the datacenters. Additionally, the nodes of the graph can represent entities that own the buildings and/or datacenters, operate the buildings and/or datacenters, offer products in the datacenters, and/or offer contractual commitments for housing or hosting the physical components. And the nodes of the graph can also represent datacenter products, for example, colocation, transport between datacenters over facilities offered by a network service provider, and interconnects. Of course, the nodes of the graph may also represent individual networks.

Some datacenter nodes of the graph may be origins of a plurality of individual ones of product edges that each point to transport products or colocation products of a respective datacenter. Also, some of the product edges may point to networks and exchanges available at a respective datacenter. And, in some cases, multiple edges may be used to interconnect nodes thereby representing redundancy or alternative paths within the graph.

In accordance with the present invention, the server hosts a route-finding application that utilizes the graph to search for an optimal path between nodes of the graph. In this context, optimization is defined according to one or more user-specified criteria. For single-hop solutions, the route-finding application performs filtering based on location constraints for determining the optimal path. For two or more-hop solutions, the route-finding application employs graphical solutions to determine the optimal path.

The route-finding application is configured to provide a user interface to a client accessing the server, and the user interface includes a screen that provides text boxes or other elements for a user at the client to enter origin and destination points for a desired path. The user interface also may provide, in response to receipt of origin and destination points for the desired path, a screen showing results of a route-finding process listed in terms of a sort criteria, for example, increasing latency, fewest hops, etc.

The route-finding application may also be configured to provide a user interface that includes one or more screens offering a user options to select a provider to provide a transport service and/or transport services for segments of a path. The route-finding application may also be configured to include a graphical view of connections between an origin site and an end point and interconnection points, e.g., in accordance with the user selections thereof.

These and further embodiments of the invention are described in greater detail below, with reference to the accompanying drawings.

BRIEF DESCRIPTION OF THE DRAWINGS

The present invention is illustrated by way of example, and not limitation, in the figures of the accompanying drawings, in which.

DETAILED DESCRIPTION

To address the above-described needs, the present applicant has developed a datastore of infrastructure resources available to entities needing same. The datastore models the industry of Internet infrastructure as a graph. Nodes of the graph represent resources and edges represent the relationships between those resources.

Within the category of resources are the physical components that make up the various networks that, collectively, interconnect with one another to form the modern Internet. Also included within the resource category are the infrastructure components that house the connectivity equipment. This includes datacenters, which are operated spaces within buildings; the buildings themselves, which represent physical locations with defined geolocations, and, somewhat more intangible, the entities that own/operate the buildings and datacenters therein and offer products in the datacenters, and even contractual commitments by and with such organizations for housing, hosting, etc.

Other kinds of resources include the datacenter products. These include colocation, often in the form of rack space within a datacenter, transport between datacenters over facilities offered by a network service provider, and interconnects, for example in the form of network exchanges or direct connections to established amenities such as public cloud facilities. Individual networks are also forms of resources included with the graph model.

Edges of the graph represent the relationship between the nodes. For example, an edge labeled "owner" may represent the relationship between a building and an entity that owns the building. Similarly, a plurality of individual edges labeled "facility" may connect the building to a respective plurality of datacenter nodes, each distinct from the other. As such, the graph would model the existence of multiple datacenters within a single building, as is often the case. Within the model the edges are directed, meaning that they point from one node to the other in accordance with the relationship defined by the edge label.

Datacenter nodes are usually origins of a plurality of individual edges labeled "product" that may each point to transport products or colocation products of the respective datacenter. As noted, transport products represent datacenter-to-datacenter connectivity, while colocation products represent physical space within the datacenter. Product edges may also point to networks and exchanges available at a datacenter, although in some embodiments more descriptive labels such as "network" and "exchange" may be used to identify such edges. Of course, other edges may also be used in the model and in some cases multiple edges may be used to interconnect nodes so as to represent redundancy or alternative paths.

Just as datacenters have products, so too may those products have products. For example, exchange and transport products may have network products, company products, etc. The present graph model is sufficiently flexible to represent relationships among virtually all infrastructure components and entities that a buyer of infrastructure may wish to know about. Importantly, the graph model "normalizes" the different nomenclature used by disparate organizations to refer to similar articles so as to bring order to what is currently a difficult to comprehend cacophony of terminology. Thus, the historically fragmented information space of Internet infrastructure offerings is organized by first mapping the different nomenclature used by various providers into a common lexicon for those offerings, then, that nomenclature is assigned to nodes and edges interconnecting the nodes within a model to provide a structure that defines and organizes the offerings in a comprehensible way according to relationships defined within the common lexicon.

Figure 1A:
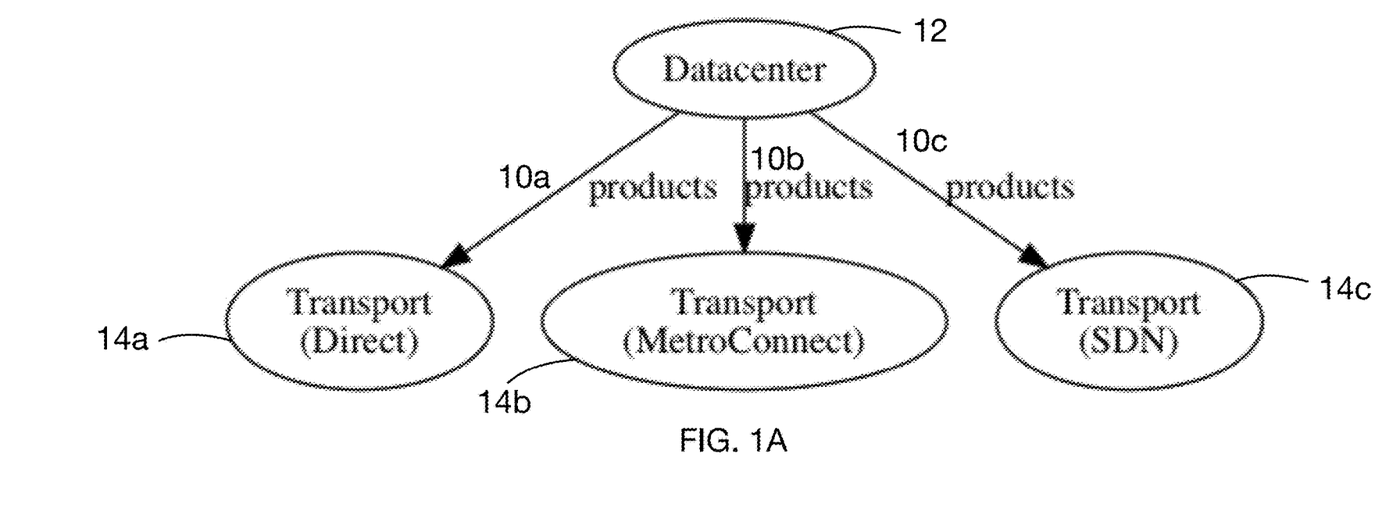
FIGS. 1A and 1B illustrate examples of the kinds of organizations represented within a graph model in accordance with embodiments of the present invention.
Figure 1B:
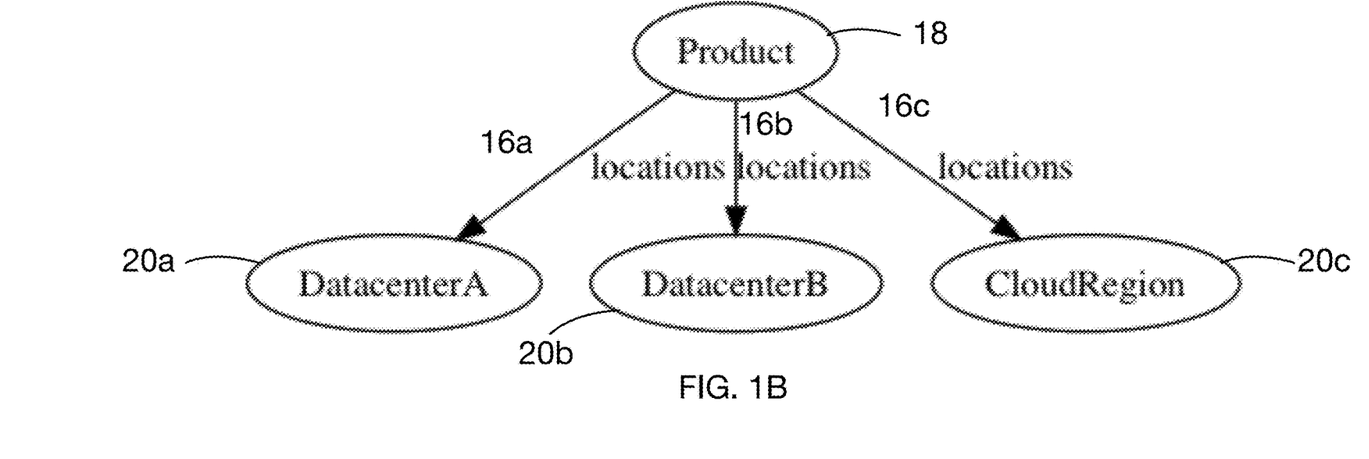

FIGS. 1A and 1B illustrate examples of the kinds of organizations represented within the present graph model. In FIG. 1A, directed edges $10a$, $10b$, $10c$, labeled "products" interconnect a datacenter node 12 and its respective transport nodes $14a$, $14b$, $14c$. In this embodiment, an edge label in the singular indicates that it is the only outgoing edge of its type that is permitted, while an edge label in the plural indicates that multiple such edges of that type are possible. In FIG. 1B, edges $16a$, $16b$, $16c$, labeled "locations" are outgoing edges from a "product" 18 to datacenters or other facilities $20a$, $20b$, $20c$ within which the product is offered.

With a model of the Internet infrastructure so established, one of the applications that is provided is the present route-finding application. Route finding within networks is often a search for an optimal path, with optimization being defined according to one or more specified criteria. For example, route length may be a criterion to be optimized, in which instance a "best" route within a network is typically a shortest path between defined endpoints. In other instances, route latency may be the criterion to be optimized, in which instance the "best" route within the network is typically the path that incurs the least amount of time for transmissions (one way or roundtrip) between the endpoints.

There exist many approaches for finding a "best" path within a graph. For example, Dijkstra's algorithm for finding a shortest path between nodes in a graph is a well-known approach. With the present graph model, however, such conventional approaches are not optimal because the number of connections represented in the graph make these approaches too time consuming. Consider that a single product to be represented in the present graph may be associated with hundreds of different locations. Each of those hundreds of locations may themselves by associated with dozens of further products, and so on. Thus, when considering paths of more than one hop within the present graph, the number of potential path permutations is exceedingly large. Conventional path finding algorithms would need to explore every available path before converging on a "best" path. Such a solution would therefore entail long time delays before responding to a user query and, therefore, are unsatisfactory. Accordingly, the present inventors have determined that new path finding approaches, including one based on set theory, represent a preferred solution.

Figure 2:
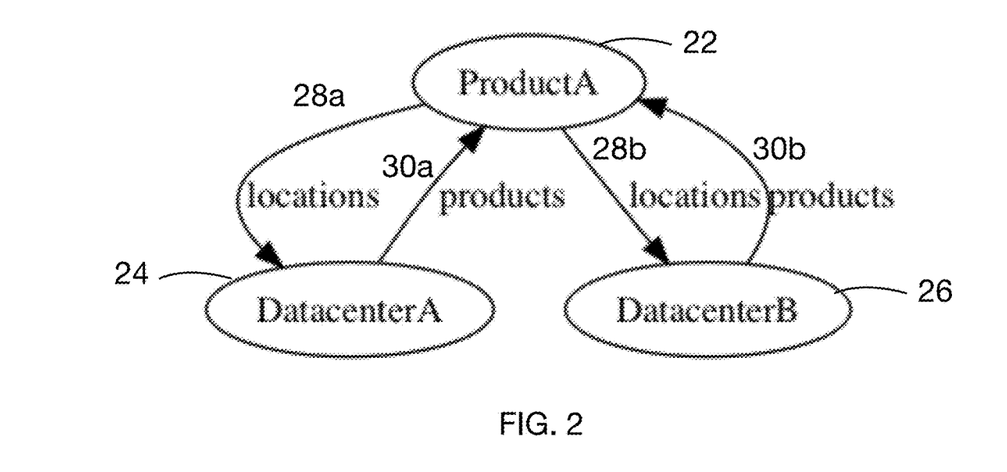
FIG. 2 shows an example in which a product represented in a graph of the kind illustrated in FIGS. 1A and 1B is available within specified datacenters, as represented by location links, in accordance with embodiments of the present invention.

For single-hop solutions, e.g., direct connections between locations, filtering based on location constraints will suffice. For example, FIG. 2 shows a rudimentary case in which a product 22 is available within datacenters A and B, 24 and 26 respectively, as represented by the location links $28a$, $28b$. Viewed differently, datacenters A and B, 24 and 26, each offer product 22, as represented by product links $30a$, $30b$. Notice that the location links are unidirectional, from product to location, as are the product links, from location to product. Recognizing that such connectivity is reflected within the graph model, a query to first identify all products which is then filtered by location constraints to include both datacenters A and B will identify direct-connection paths between datacenter A and datacenter B.

Figure 3:
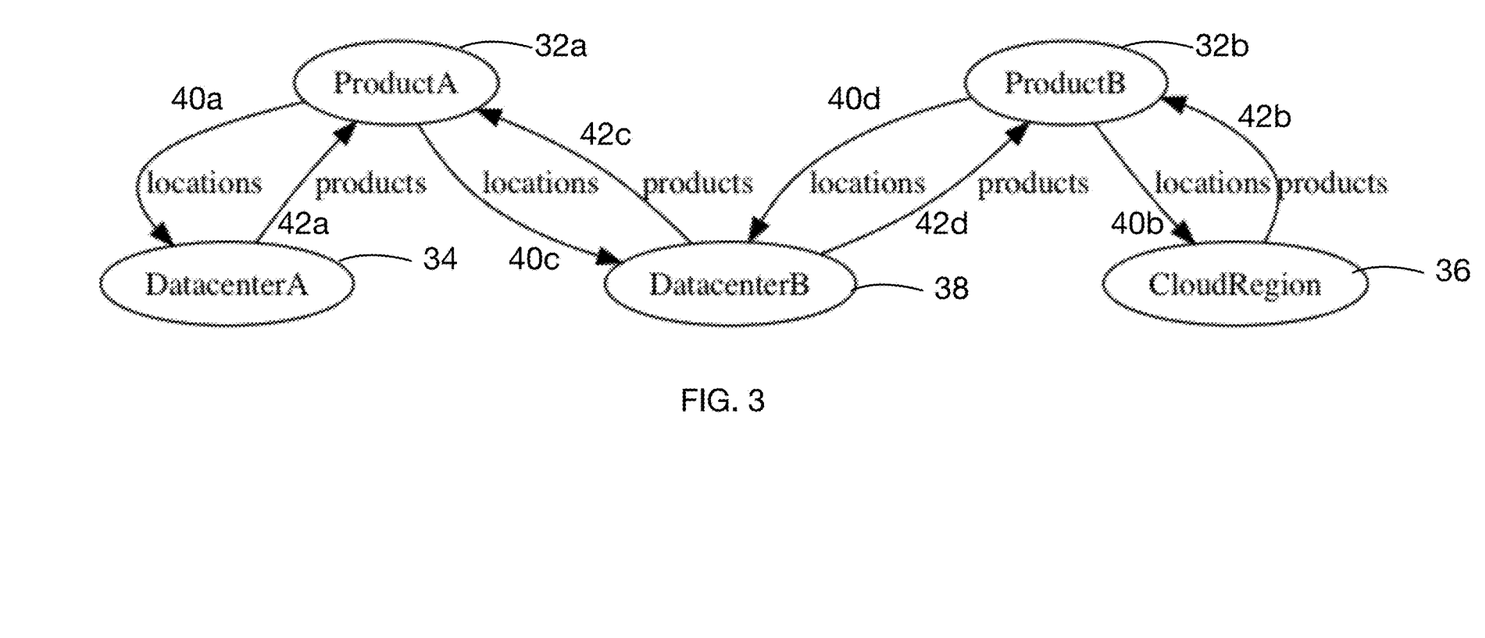
FIG. 3 illustrates an example of graph of the kind shown in FIGS. 1A and 1B in which a path between locations through one or more intermediaries exists.

For two or more-hop solutions, those in which a path between locations through one or more intermediaries exist, the situation is more complex. FIG. 3 illustrates such a situation. In this example, product 32a is available within datacenters 34 and 38, while product 32b is available within datacenter 38 and cloud region 36, all as reflected by location edges 40a, 40b, 40c, 40d, and/or product edges 42a, 42b, 42c, 42d. While correlations of location-filtered product queries to reveal paths between datacenter 34 and cloud region 36 could be used, the time taken to produce such solutions, especially within graphs that model the entirety of the Internet infrastructure, is at best inconvenient and, at worst, prohibitive.

Figure 4:
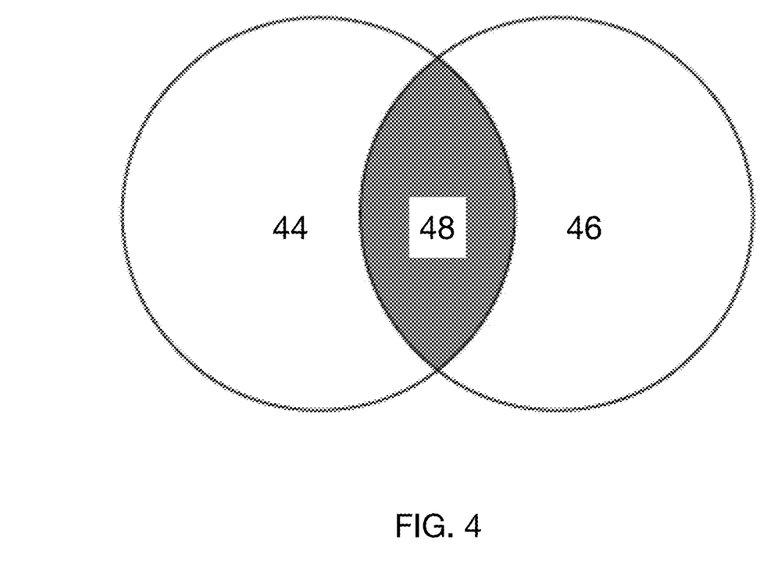
FIG. 4 illustrates an example of a graphical solution to a path finding problem in accordance with embodiments of the present invention.

Accordingly, the present inventors have recognized that graphical solutions to the above problem are available. As shown in FIG. 4, if region 44 is defined to include all of the serviced locations reachable within one hop of datacenter A 34, and region 46 is defined to include all of the serviced locations reachable within one hop of cloud region 36, then their intersection, region 48, will include the set of intermediaries that can serve as cross-connect locations to provide a two-hop solution between datacenter A 34 and cloud region 36. More formally:

Region 44⊆Datacenter A→Products→Locations

Region 46⊆CloudRegion→Products→Locations

Region 48⊆A∩B

To build a resulting path, one can begin with the group of locations defined by region 48 and follow product→location edges filtering by datacenter A and the cloud region. The result will be interconnection points that include products associated with products associated with each leg of the path. Similar approaches can be adopted for paths that incur additional hops. Such search and filter operations run within much shorter times than would conventional shortest path algorithms that started at a source node and looked for paths to a designated end node, and so are better suited to consumer-facing applications designed to provide route-finding facilities.

Figure 5:
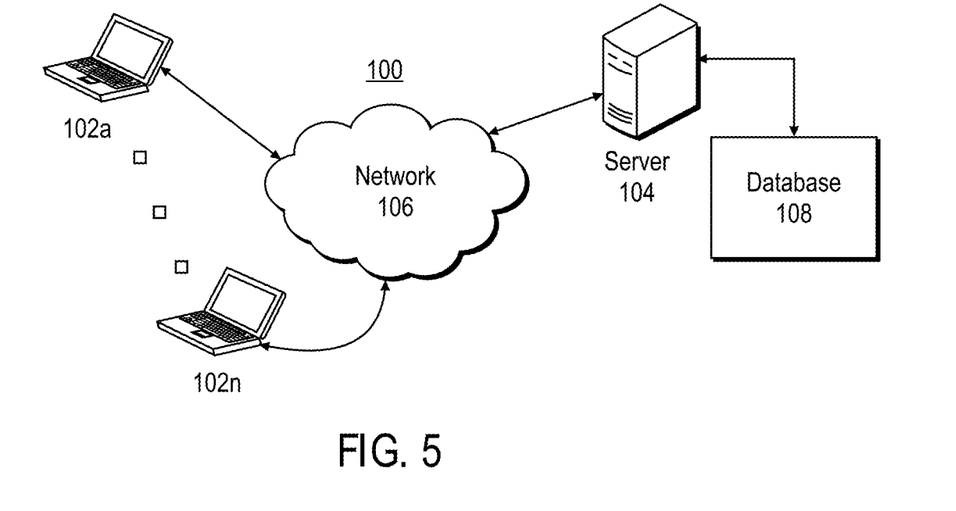
FIG. 5 illustrates an example of an embodiments of the present invention implemented as a route-finding service running on a server and accessible over the Internet or other computer network(s) by one or more clients.

Embodiments of the present invention may be implemented as a route-finding service running on a server and accessible over the Internet or other computer network(s) by one or more clients. FIG. 5 illustrates such an embodiment. Illustrated is a simplified computer network 100 that includes one or more client computer systems 102a-102n, which may be used by individuals seeking to access a server 104 at which an instantiation of a computer-based application that provides the route-finding features discussed above may be installed and accessible. Such access may be a computer network or network of networks 106, such as a local and/or wide area network. In some cases, network 106 may be or include the network of networks such as the Internet. In other instances, network 106 may be a local area network (LAN) of an enterprise and/or a virtual LAN which is instantiated over the Internet or other networks of networks. Server 104 is communicatively coupled to a database 108, which may store the graph model as described above. Client computers 102a-102n may be any form of computer-based system, including personal computers, mobile devices, and the like. Generally, a client computer 102 will run a Web browser application, through which the route-finding application running on server 104 may be accessed, however, in some in stances, client computers 102 may run a client application specially configured to interface with the route-finding application running on server 104.

Figure 6:
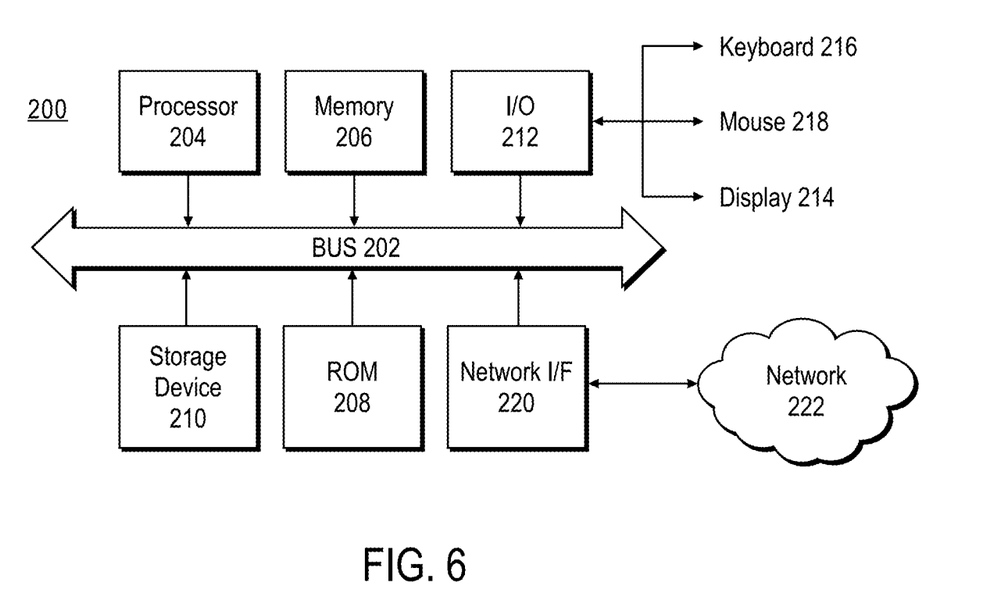
FIG. 6 is a block diagram illustrating an example of a computer system suitable for use as a server running a route-finding service in accordance with embodiments of the present invention and/or a client making use of such a resource.

FIG. 6 is a block diagram illustrating an example of a computer system 200. Any of client computer systems 102a-102n and/or server 104 may be configured in the manner described for computer system 200. Computer system 200 includes a bus 202 or other communication mechanism for communicating information, and a processor 204 coupled with the bus 202 for processing in formation. Computer system 200 also includes a main memory 206, such as a random-access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A computer readable storage device 210, such as a magnetic disk or optical dis k, is provided and coupled to the bus 202 for storing information and instructions.

Computer system 200 may be coupled via the bus 202, either directly or via an input/output module 212, to a display 214 for displaying information, such as the user interface screens described below, to a computer user. An input device 216, including alphanumeric and other keys, is coupled to the bus 202 for communicating information and command selections to the processor 204. Another type of user input device is cursor controller 218, such as a mouse, a trackball, or cursor direction keys for communicating direction information and command selections to processor 204 and for controlling cursor movement on the display 214.

As should be apparent, aspects of the present invention involve computer software running on server 104. That software may take the form of computer-executable instructions stored in main memory 206 and/or storage device 210, to be executed by processor 204. In other instances, the instructions may be stored on other tangible computer readable media, such as a floppy disk, a flexible disk, a hard disk, magnetic tape, or any other magnetic medium, a CD-ROM or DVD-ROM, flash memory, or any other physical medium adapted to store computer-readable instructions and from which a computer processor can read. Execution of the sequences of instructions contained in the main memory 206 causes the processor 204 to perform the processes described herein to provide the route-finding application and solutions.

Computer system 200 also includes a network interface 220 coupled to the bus 202. Network interface 220 provides a two-way data communication path for computer system 200 to/from a network 222. For example, network interface 220 may be an integrated services digital network (ISDN) card or a modem to provide a data communication connection to a corresponding type of telephone line. As another example, communication interface 220 may be a LAN card to provide a data communication connection to a compatible LAN. Wireless communication links may also be implemented. In any such implementation, network interface 220 sends and receives electrical, electromagnetic or optical signals which carry digital data streams representing various types of information. In one embodiment, network 222 may be network 106, or may be communicatively coupled thereto.

Figure 7:
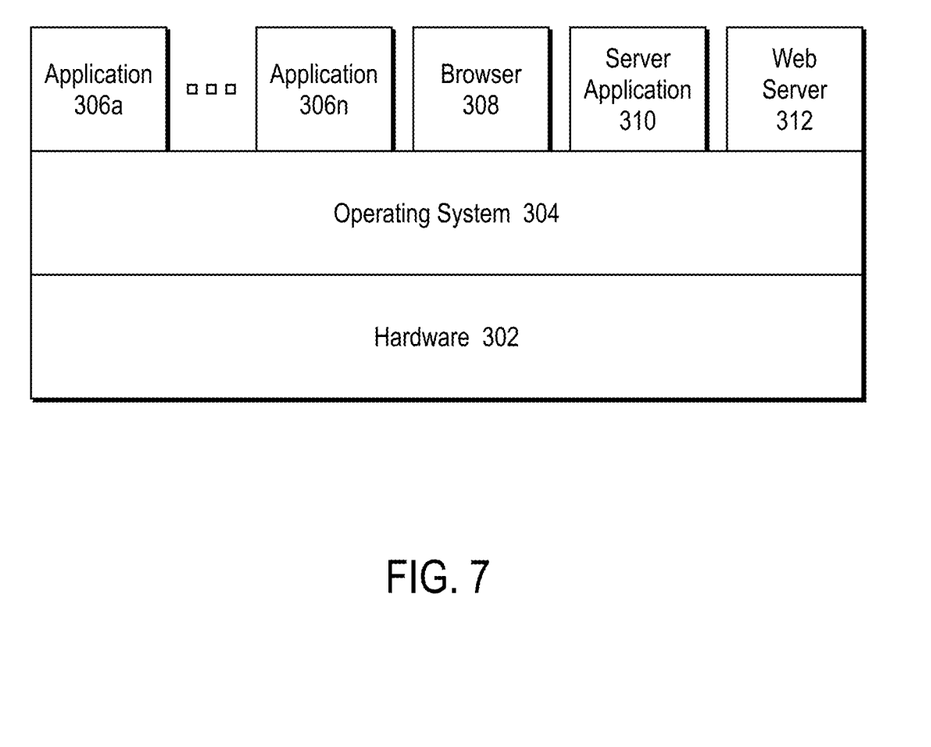
FIG. 7 shows an architecture view of a computer system such as that shown in FIG. 6.

FIG. 7 shows an architecture view of computer system 200. The various hardware components of computer system 200 are represented as a hardware layer 302. An operating system 304 abstracts the hardware layer and acts as a host for various applications 306a-306n, that run on computer system 200. In the case of a client computer system, the operating system also acts as a host for a Web browser application 308, while in the case of the server 104, the operating system acts as a host for a server application 310 configured to perform the processes described herein. For the server 104, the operating system may also host a web server application 312, which provides access from the client computers via web browsers. In other instances, the web server may be hosted on a separate server (not shown in detail), which is communicatively coupled to a server hosting application 310.

Figure 8A:
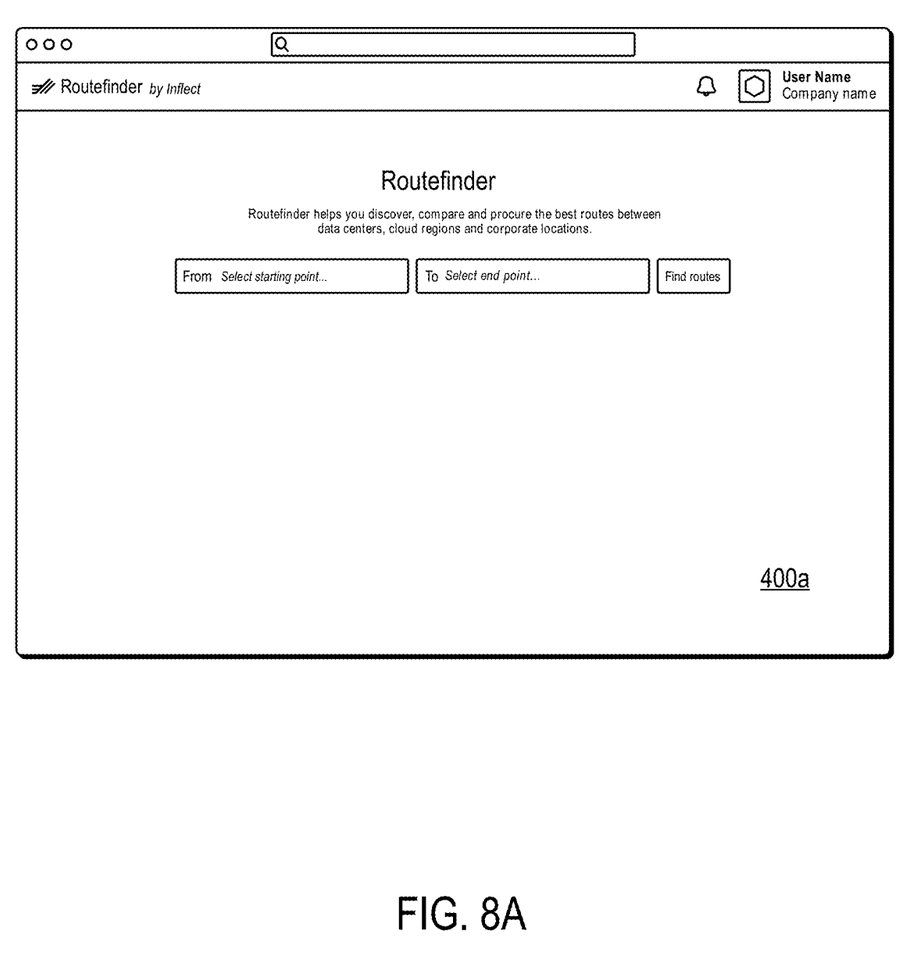
FIGS. 8A-8C illustrate example screens of a user interface that may be provided by a server application to clients seeking access to a route-finding application configured in accordance with embodiments of the present invention.
Figure 8B:
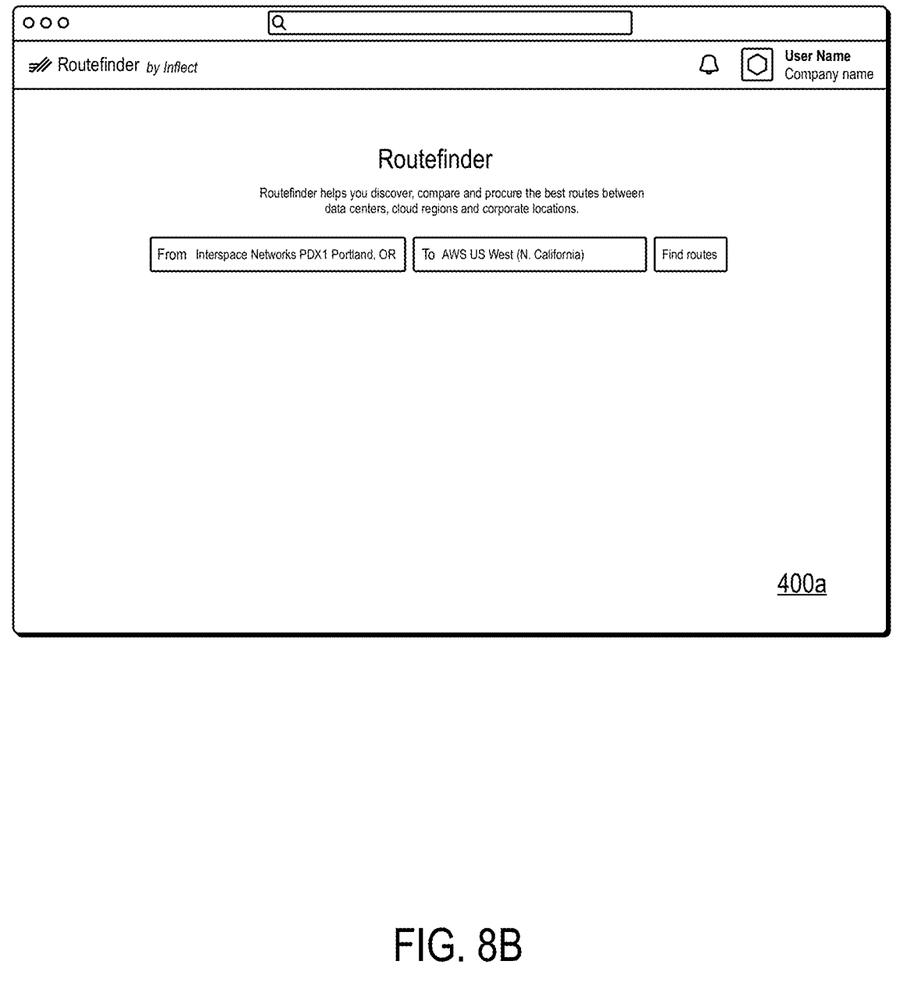
Figure 8C:
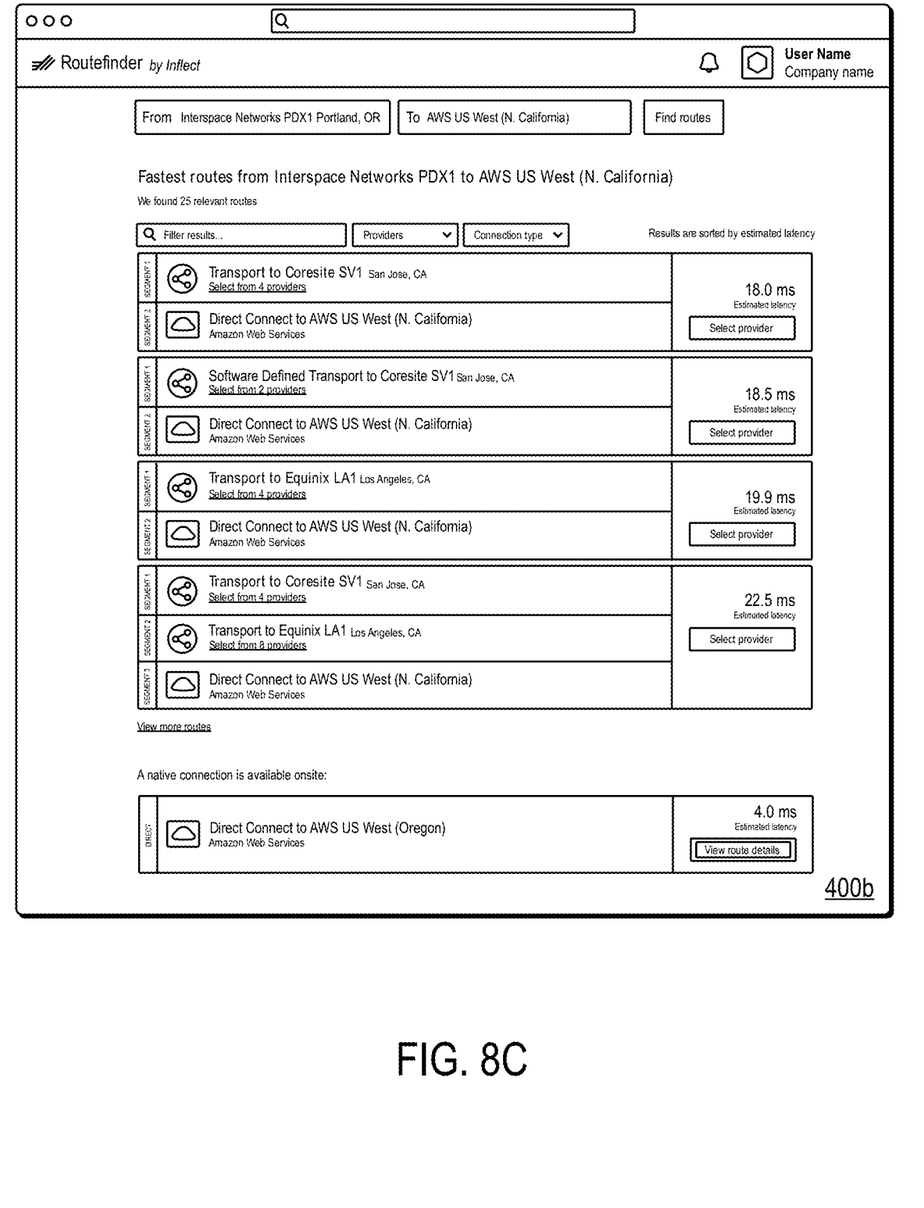

FIGS. 8A-8C illustrate example screens of a user interface that may be provided by server application 310 to clients seeking access to a route-finding application configured in accordance with embodiments of the present invention. In FIG. 8A, screen 400a provides text boxes for a user at a client to enter origin and destination points for a desired path. The interface may be configured so that entries in the origin and destination boxes display available options as a user begins entering text. Alternatively, or in addition, auto-complete facilities may be provided to complete an entry of the entered text that leaves only one available option. In FIG. 8B, an origin of Interspace Networks PDX1 in Portland, Oreg. and a destination of AWS US West in California have been designated.

In FIG. 8C, screen 400b shows results of the route-finding application. The listed possible paths were determined in accordance with the above-described processes and are listed in terms of increasing latency. Other sort options are available, for example fewest hops, or other specified criteria.

Figure 9:
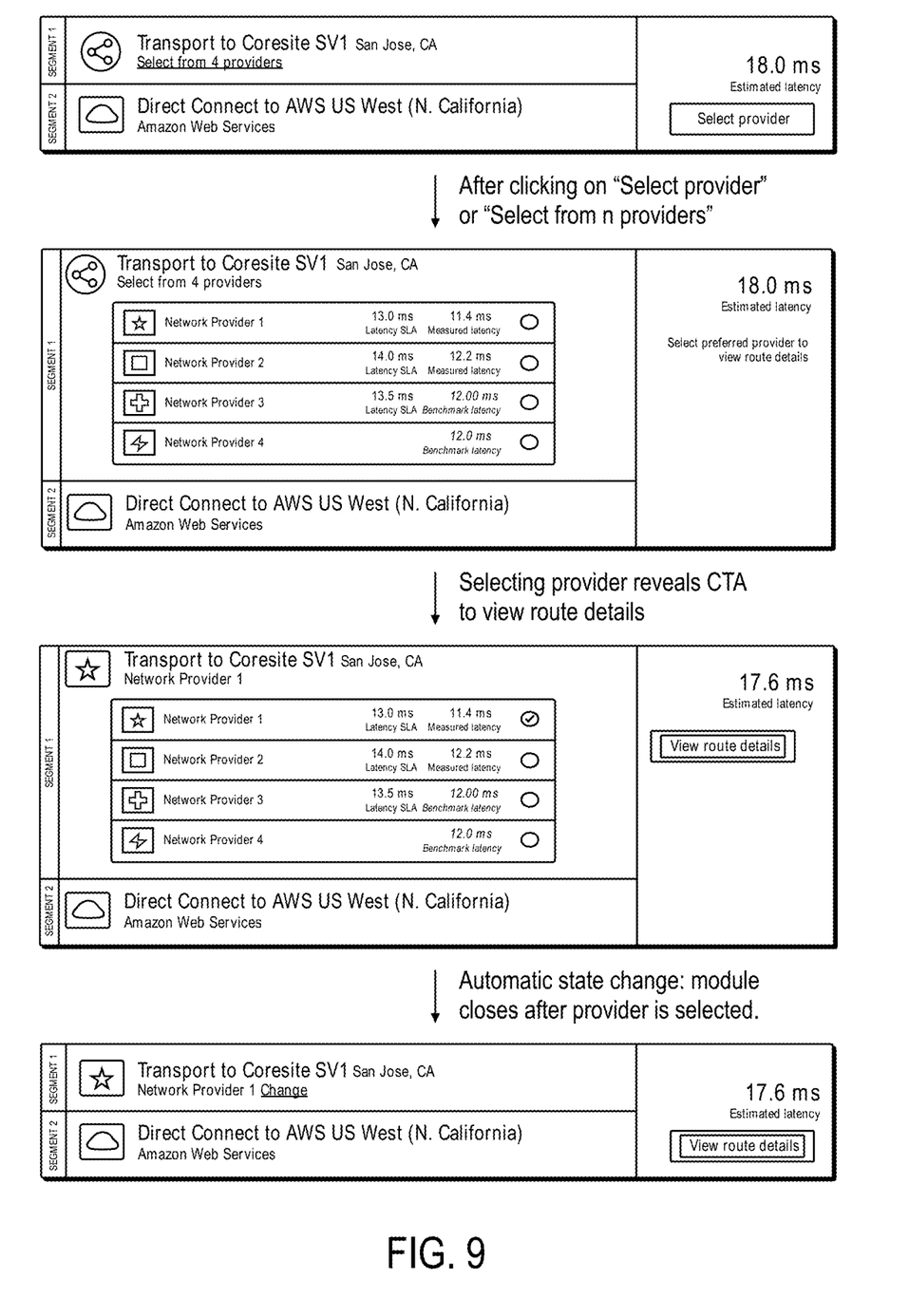
FIG. 9 illustrates an example of a workflow for a user using the route finder application described herein.

FIG. 9 illustrates an example of a workflow for a user using the route finder application described herein. From the results screen above, the user has selected a path with 18 ms latency that involves a transport product to Coresite SV1 in San Jose, Calif., and then a direct connection to AWS US West. The user is first required to select a provider to provide the transport service to Coresite SV1. In this example the selection is made by first displaying the list of available providers (responsive to the user indicating the selection menu should be displayed) that offer such a transport service and receiving a selection through designation via a radio button. With the selection made, the selection menu closes, displaying the selected options.

Figure 10A:
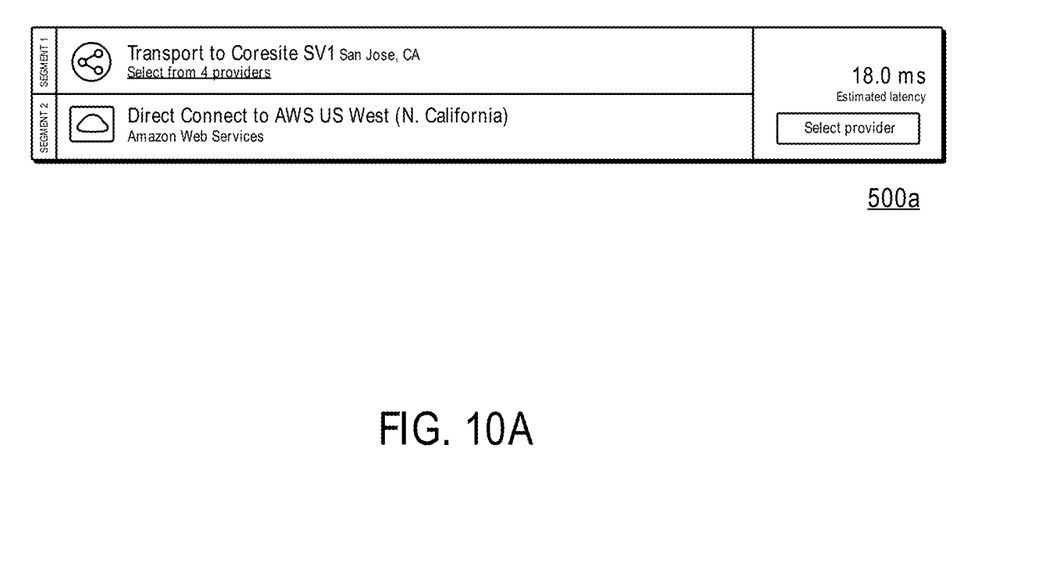
FIGS. 10A-10C illustrate an example of selections from a user interface of the kind shown in FIGS. 8A-8C for a three-segment route.
Figure 10B:
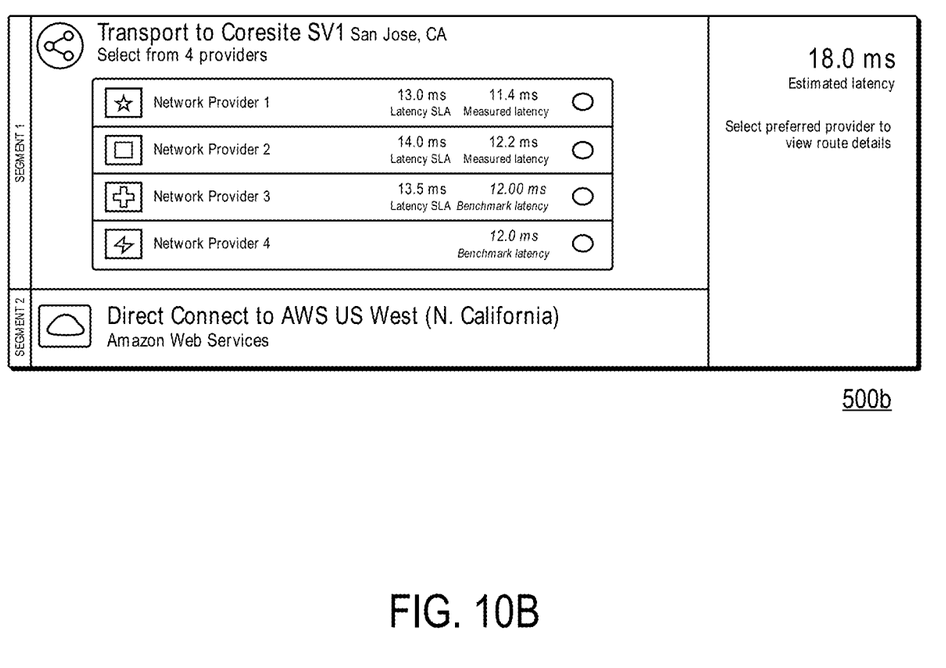
Figure 10C:
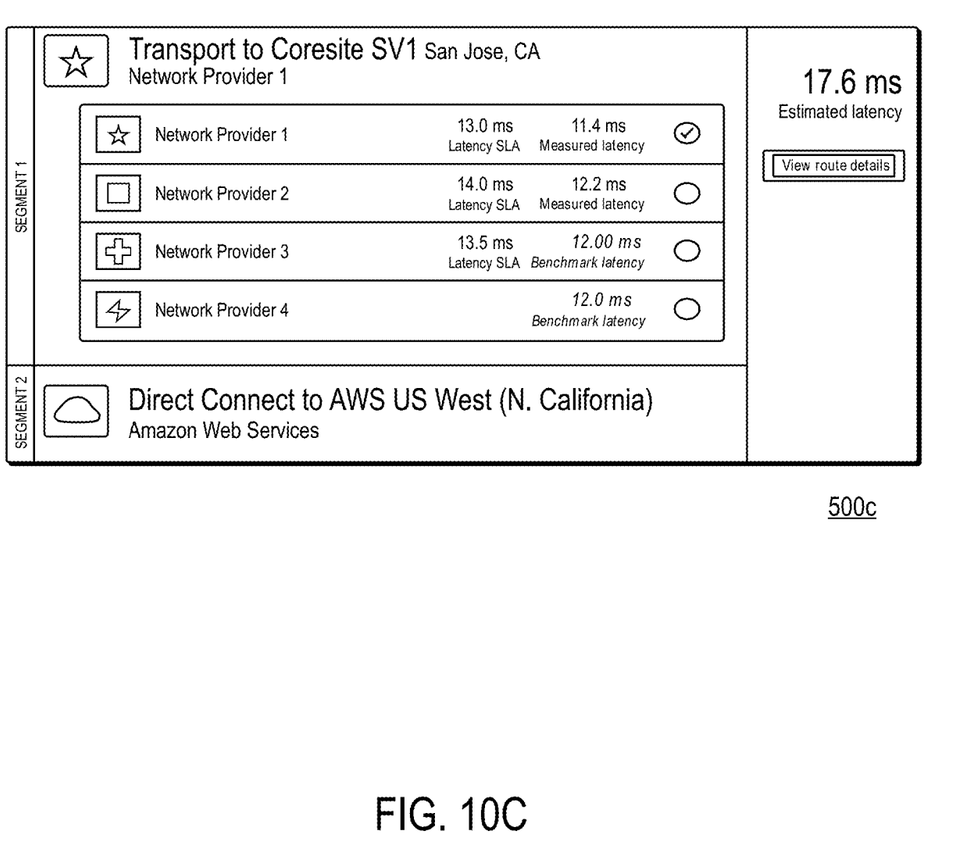

FIGS. 10A-10C illustrate an example of selections for a three-segment route. In FIG. 10A, screen 500a shows the overall desired route that includes transport to Coresite SV1 and then direct connection to AWS at US West.

Figure 10D:
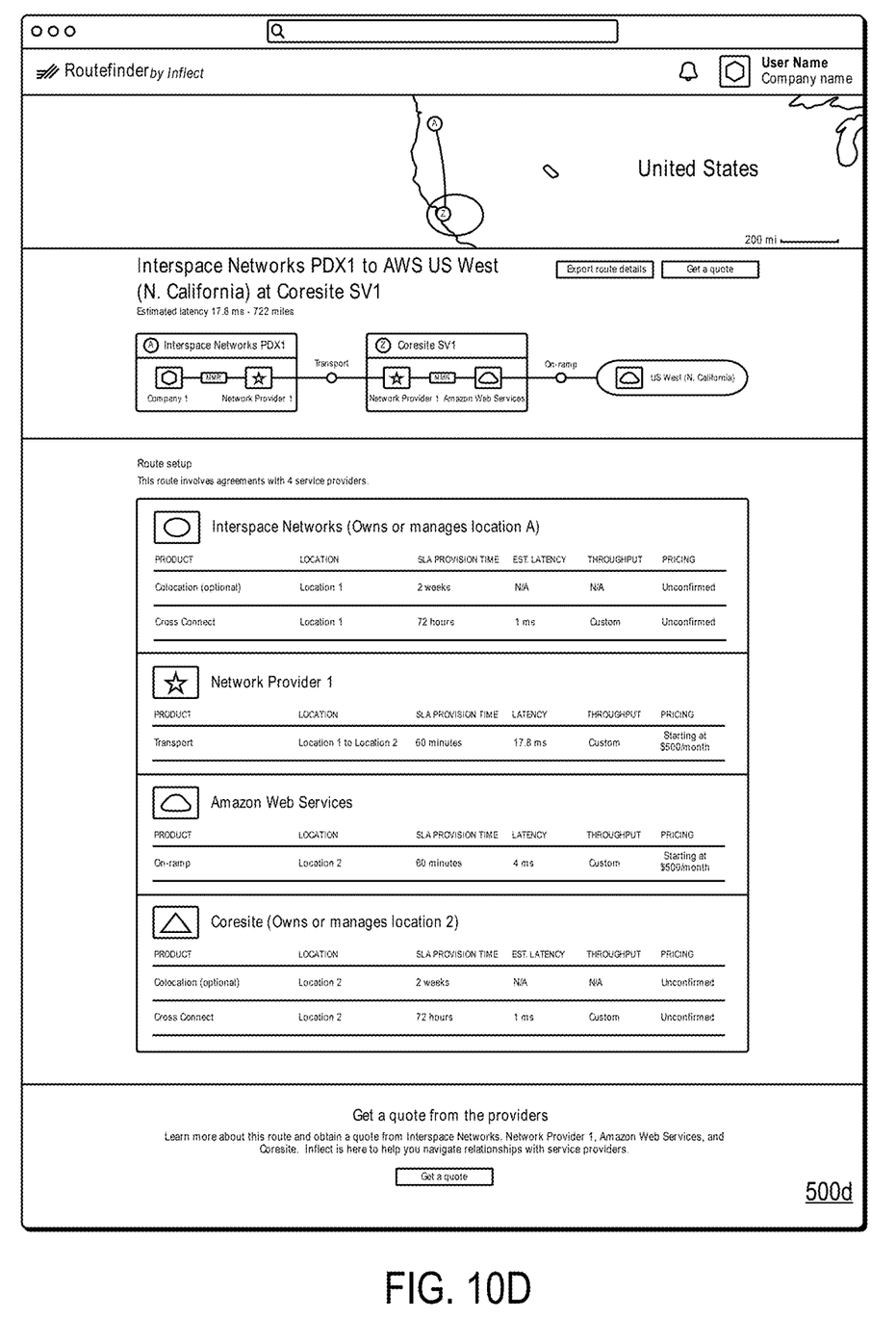
FIG. 10D shows a screen including a competed selected path of selections for a three-segment route.

In FIG. 10B, screen 500b is a menu that offers selection options for a first transport segment. Screen 500c, in FIG. 10C, shows the completed selection via radio button. Similar menus and selections may be provided for other segments. Finally, in FIG. 10D, screen 500d shows the competed selected path. Selected providers and other segment constituents are shown as is a map-view of the selected path. Also illustrated graphically are the connections within the origin site, end point and interconnection points.

Thus, methods and systems for route finding in networks and/or in a network of networks, for example, the Internet, have been described.

What is claimed is:

1. A system for route finding in networks and/or in a network of networks, comprising:
a server communicatively coupled to a datastore, said datastore hosting a model of an industry of Internet infrastructure as a graph,
wherein nodes of the graph represent physical components that make up various networks that, collectively, interconnect with one another, infrastructure components that house the physical components and equipment that connects the physical components, and edges of the graph represent relationships between the physical components,
wherein said server hosts a route-finding application that uses said graph to search for an optimal path between two of the nodes of the graph, wherein optimization is defined according to one or more user-specified criteria, and
wherein the route-finding application is configured to provide a user interface to a client accessing the server, said user interface including one or more screens displaying a first segment of a candidate path and a second segment of the candidate path, and offering a user options to select a first provider to provide a first transport service for the first segment and a second provider to provide a second transport service for the second segment.

2. The system of claim 1, wherein the physical components and equipment that connects the physical components include datacenters, which are operated spaces within buildings, and the infrastructure components include the buildings housing the datacenters.

3. The system of claim 2, wherein the nodes of the graph further represent entities that own the buildings and/or the datacenters, operate the buildings and/or the datacenters, offer products in the datacenters, and/or offer contractual commitments for housing or hosting the physical components.

4. The system of claim 3, wherein the nodes of the graph further represent datacenter products.

5. The system of claim 4, wherein the datacenter products include some or all of: colocation, transport between the datacenters over facilities offered by a network service provider, and interconnects.

6. The system of claim 5, wherein the nodes of the graph further represent individual networks.

7. The system of claim 5, wherein within the graph the edges are directed in accordance with an edge label.

8. The system of claim 5, wherein at least some nodes of the graph are origins of a first plurality of individual ones of the edges that each point to transport products or colocation products of a respective one of the datacenters.

9. The system of claim 8, wherein at least some of the first plurality of edges point to networks and exchanges available at a respective one of the datacenters.

10. The system of claim 5, wherein at least two of the edges represent redundancy or alternative paths within the graph.

11. The system of claim 1, wherein for single-hop solutions the route-finding application performs filtering based on location constraints for determining the optimal path.

12. The system of claim 1, wherein for two or more hop solutions the route-finding application employs graphical solutions to determine the optimal path.

13. The system of claim 1, wherein said user interface further includes a screen that provides text boxes for the user at the client to enter origin and destination points for a desired path.

14. The system of claim 13, wherein the user interface further includes, in response to receipt of the origin and destination points for the desired path, a screen showing results of a route-finding process, listed in terms of a sort criteria.

15. The system of claim 14, wherein the sort criteria is one of: increasing latency or fewest hops.

16. The system of claim 1, wherein said user interface further includes a graphical view of connections between an origin site and an end point and interconnection points.

17. The system of claim 1, wherein the route-finding application employs a determination of an intersection of two sets of locations, the respective locations associated with datacenter products, and the intersection determined using the graph to obtain a two-hop optimal path between the two nodes of the graph.

* * * * *